United States Patent [19]

Roskott et al.

[11] 3,819,495

[45] June 25, 1974

[54] STABILIZER SYSTEMS FOR LIGHT-CURABLE POLYESTERS

[75] Inventors: Lodweijk Roskott, Deventer; Arnoldus Adrianus Maria Groenendaal, Vorden; Hans Jaspers, Diepenveen, all of Netherlands

[73] Assignee: Akzo N.V., Arnhem, Netherlands

[22] Filed: Jan. 31, 1973

[21] Appl. No.: 328,438

[30] Foreign Application Priority Data

Feb. 4, 1972 Netherlands...................... 7201453

[52] U.S. Cl. 204/159.19, 204/159.15, 204/159.2 B, 260/28, 260/28.5 R, 260/41 A, 260/41 B, 260/45.75 C, 260/45.8 N, 260/45.9, 260/861, 260/863, 260/864

[51] Int. Cl............................. B01j 1/10, B01j 1/12

[58] Field of Search............ 260/45.95 C, 45.9, 861, 260/863, 864, 45.75 R, 159.15; 204/159.19

[56] References Cited
UNITED STATES PATENTS

| | | | |
|---|---|---|---|
| 3,188,363 | 6/1965 | Amidon et al. | 260/45.75 C |
| 3,627,657 | 12/1971 | Nistri et al. | 204/159.15 |

*Primary Examiner*—Murray Tillman
*Assistant Examiner*—Richard B. Turer
*Attorney, Agent, or Firm*—Stevens, Davis, Miller & Mosher

[57] ABSTRACT

A stabilized composition curable by U.V. light, comprising an unsaturated polyester resin, a benzoin ether of a primary alcohol, a copper compound soluble in the polyester resin and at least one organic compound having ionically-bound chlorine or capable of forming chlorine ions in situ.

17 Claims, No Drawings

STABILIZER SYSTEMS FOR LIGHT-CURABLE POLYESTERS

The present invention relates to a process for the preparation of a stabilized composition which is curable by U.V. light, to the composition per se and also to the curing of this composition.

The present invention relates to a process for the preparation of a stabilized, U.V. light curable composition, which comprises an unsaturated polyester resin, a benzoin ether of a primary alcohol and a copper compound which is soluble in the resin. After curing the composition by U.V. light a polyester has been obtained suitable for e.g., surface coatings.

The expression "unsaturated polyester resin" as used herein means a mixture of an unsaturated polyester and one or more polymerizable ethylenically-unsaturated monomers, such as styrene, vinyl toluene, methylmethacrylate, diallyl phthalate, divinyl benzene, p-tert.butylbenzene and vinyl acetate. Reference is made to U.S. Pat. No. 3,367,994.

The weight ratio of monomer to unsaturated polyester generally ranges from 30–50 parts of monomer to 70–50 parts of polyester.

The unsaturated polyester may be obtained by reacting a polyhydric alcohol, such as ethylene glycol, propylene glycol or diethylene glycol, with an unsaturated dibasic carboxylic acid, such as maleic acid, fumaric acid or itaconic acid, if desired in the presence of a saturated acid, such as malonic acid, adipic acid, sebacic acid or tartaric acid, and also phthalic acid, isophthalic acid or tetrachlorophthalic acid.

In order to prevent the unsaturated polyester resin from undergoing premature gelation, a stabilizer is desirably added to the polyester in a quantity of 0.005 – 0.15 percent by weight, preferably 0.01 percent by weight calculated on the unsaturated polyester. The stabilizers hitherto most used are hydroquinone and p.tert.-butylcatechol. Unsaturated polyester resins may be cured with the aid of U.V. irradiation. For rapid curing, photoinitiators are incorporated in the unsaturated polyester resin in an amount of 0.1 – 5 percent, preferably 1 – 2 percent by weight calculated on the polyester resin. The preferred photo-initiators are benzoin ethers derived from primary alcohols, such as methyl alcohol and ethyl alcohol, propyl alcohol, n-butyl alcohol, isobutyl alcohol and 2-ethylhexyl-alcohol.

However, unsaturated polyester resins containing benzoin ethers derived from primary alcohols as photo-initiators have the disadvantage that they gel prematurely on storage in the dark. In German Auslegeschrift No. 1,902,930 a copper compound which is soluble in the resin is recommended for incorporation in the polyester resin, in addition to the primary alcohol benzoin ether and the usual stabilizer. Suitable copper compounds are copper acetate, copper laurate, copper ethylene diamine triacetate, copper citrate, copper benzoate and, particularly, copper naphthenate, copper stearate, copper octoate and copper acetylacetonate. The copper compounds are incorporated in the resin in an amount of 0.00001 – 0.001% preferably 0.0001 – 0.0002 percent by weight of copper, calculated on the polyester resin.

It has now been found that a composition having a surprisingly good storage stability in the dark may be obtained by incorporating as a stabilizer an organic compound which either contains ionically bound chlorine or is capable of forming chlorine ions in situ, in an U.V. light curable composition comprising an unsaturated polyester resin, a benzoin ether of a primary alcohol as a photo-initiator and a copper compound soluble in the resin. Further, it has been found that the rate of curing is not affected unfavorably by curing the resin with U.V. light. Organic chlorine-containing compounds, such as tri-alkylbenzyl ammonium chloride, are known to be suitable for use as stabilizers for polyester resins. However, it was not known that the combination of these compounds with copper compounds as a stabilizer for U.V. light curable polyester resins has a stabilizing effect greater than might be expected from each of the compounds alone.

Quaternary ammonium chlorides such as $C_{12}$-$C_{18}$-alkyldimethylbenzyl ammonium chloride, $C_{12}$-$C_{18}$-alkyldimethylethylbenzyl ammonium chloride, phenyltrimethyl ammonium chloride, stearyldimethylbenzyl ammonium chloride, alkylmethylisoquinolinium chloride, di-alkyldimethyl ammonium chloride, and salts of amines with hydrochloric acid, such as dimethylamine.HCl, benzylamine.HCl and triethylamine.HCl may be mentioned as examples of organic compounds which contain ionically-bound chlorine ions. Compounds having the general formula:

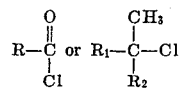

wherein R represents an alkyl group, $C_5$–$C_{20}$, or a substituted or non-substituted aryl group, of $C_6$–$C_{12}$, $R_1$ is a substituted or non-substituted aryl group, $C_6$–$C_{12}$ and $R_2$ represents a hydrogen atom or an alkyl group, $C_1$–$C_4$, such as lauroyl chloride, 2-ethylhexanoyl chloride, ortho-methylbenzoyl chloride, benzoyl chloride and cumyl chloride, may be mentioned as examples of organic compounds capable of forming chlorine ions in situ. It has been found that those organic chlorine compounds which cause a precipitate of silver chloride, when 0.1 to 1.0 g of the compound is dissolved in about 10 ml of a mixture of water and acetone in a ratio of 4:1 to 1:1 followed by the addition of about 0.5 ml of 4N nitric acid and a few drops of 0.1N silver nitrate, are capable of forming chlorine ions in situ in a polyester resin. Dependent upon the nature of the resin and the copper compound used, 0.001 – 0.1 percent and, preferably 0.01 – 0.05 percent, by weight, of stabilizer according to the present invention, calculated on the polyester resin, may be incorporated in the resin.

If desired, fillers, such as calcium carbonate, calcium magnesium carbonate, magnesium silicate, silicon oxide, aluminum silicate, barium sulphate, or calcium sulphate, may be added to the polyester resin so as to formulate it for use as a putty, in an amount of 5–500 percent and preferably 25–250 percent by weight, calculated on the polyester resin. In order to prevent air-inhibition, 0.1 percent by weight of a solid paraffin having a melting point of 52°–54° C. may be added to resins which do not contain fillers. The composition according to the present invention may be cured in the usual way. To this end, the composition according to the present invention was spread by means of a film drawing knife on a glass plate in layers having a thickness of 300 μ. Subsequently, these layers were irradiated for 120 sec. with an U.V. light source placed 20 cm above the resin sheets. The light source had a light emission mainly in the range from 300 to 400 millimicrons. The curing was determined with an oscillation hardness measuring apparatus according to Persoz. The curing of putties was determined with the aid of the residual styrene-content of the resin cured according to the method described in "Kunststoffe," 53 (10) 801–804 (1963). The storage stability of the unsaturated resin was determined in the dark at a temperature of 100° C.

The present invention will be illustrated by the following Examples which are by no means limitative. In these Examples where reference is made to an unsaturated polyester resin, this refers to an all-purpose composition obtained by condensing 1 mol of maleic acid anhydride and 1 mol of phthalic acid anhydride with 1.1 mol of ethylene glycol and 1.1 to 1.2 mol of propanediol-1,2. The esterification took place at a temperature of 200° C. while stirring and under a current of nitrogen. After the addition of 0.01 part by weight of hydroquinone to 100 parts by weight condensate, the latter was mixed with styrene in a ratio of 65:35. The unsaturated polyester resin thus obtained had an acid number of about 50.

EXAMPLE I 2 parts by weight of benzoin ether of a primary alcohol, 0.0002 parts by weight of copper in the form of a copper naphthenate or copper octoate and a certain quantity by weight of a stabilizer according to the present invention were added to 100 parts by weight of the unsaturated polyester resin hereinbefore described. The stability in the dark at 100° C. and the hardness according to Persoz of the composition thus obtained were determined. Comparable tests were made with a polyester resin containing a benzoin ether of a primary alcohol, no copper or solely copper or a stabilizer according to the present invention. The results obtained are tabulated hereafter in Table 1.

EXAMPLE II 2 parts by weight of n-butyl ether of benzoin, 0.0002 parts by weight of copper in the form of copper naphthenate or copper octoate, a stabilizer according to the present invention and a filler were added to 100 parts by weight of the unsaturated polyester resin hereinbefore described. The stability in the dark at 100° C. and the residual styrene-content after curing of the composition thus obtained were determined. Comparable tests were made with a composition containing polyester resin, a filler and n-butyl ether of benzoin, with a composition containing in addition copper, and with a composition containing instead of copper a stabilizer according to the present invention. The results obtained are tabulated hereafter in Table 2.

Table 1

| Benzoin ether | copper | % by weight | stabilizer | stability in min. at 100°C. | hardness according to Persoz after lighting for 2 minutes |
|---|---|---|---|---|---|
| n-butyl | — | — | — | 30 | 250 |
| n-butyl | + | — | — | 80 | 230 |
| n-butyl | — | 0.05 | trialkylbenzyl ammonium chloride* | 53 | 263 |
| n-butyl | + | 0.05 | trialkylbenzyl ammonium chloride* | 308 | 260 |
| n-butyl | + | 0.013 | ethylene diamine.HCl | 120 | 258 |
| n-butyl | — | 0.02 | cumyl chloride | 32 | 268 |
| n-butyl | + | 0.02 | cumyl chloride | 190 | 260 |
| n-ethyl | — | — | — | 32 | 268 |
| n-ethyl | + | — | — | 65 | 268 |
| n-ethyl | — | 0.01 | dimethyl-amine. HCl | 27 | 268 |
| n-ethyl | + | 0.01 | dimethyl-amine.HCl | 164 | 269 |
| n-propyl | — | — | — | 30 | 272 |
| n-propyl | + | — | — | 115 | 256 |
| n-propyl | — | 0.02 | o-methylbenzoyl chloride | 39 | 276 |
| n-propyl | + | 0.02 | o-methylbenzoyl chloride | 184 | 269 |

*mixture of
40% of dodecyldimethylbenzyl ammonium chloride
50% of tetradecyldimethylbenzyl ammonium chloride
10% of hexadecyldimethylbenzyl ammonium chloride Table 2

| benzoin-n-butyl ether | copper | % by weight | filler | % by weight | stabilizer | stability in min. at 100°C. | residual styrene content after lighting for 2 minutes |
|---|---|---|---|---|---|---|---|
| + | — | 150 | calcium carbonate | — | — | 10 | 0.091 |
| + | + | 150 | calcium carbonate | — | — | 12 | 0.95 |
| + | — | 150 | calcium carbonate | 0.05 | trialkylbenzyl-amm.chloride* | 14 | 0.81 |
| + | + | 150 | calcium carbonate | 0.05 | trialkylbenzyl-amm.chloride* | 21 | 0.83 |
| + | — | 50 | aluminium silicate | — | — | 12 | 0.97 |
| + | + | 50 | aluminium silicate | — | — | 18 | 1.02 |
| + | — | 50 | aluminium silicate | 0.05 | trialklbenzyl-amm.chloride* | 27 | 0.91 |
| + | + | 50 | aluminium silicate | 0.05 | trialklbenzyl-amm.chloride* | 52 | 0.90 |
| + | — | 50 | aluminium silicate | 0.05 | phenyltrimethyl-amm.chloride | 25 | 0.92 |

Table 2.—Continued

| benzoin-n-butyl ether | copper | % by weight | filler | % by weight | stabilizer | stability in min. at 100°C. | residual styrene content after lighting for 2 minutes |
|---|---|---|---|---|---|---|---|
| + | + | 50 | aluminium silicate | 0.05 | phenyltrimethyl-amm.chloride | 50 | 0.92 |
| + | − | 50 | aluminium silicate | 0.05 | stearyldimethyl-benzylamm·chloride | 23 | 0.94 |
| + | + | 50 | aluminium silicate | 0.05 | stearyldimethyl-benzylamm·chloride | 48 | 0.91 |
| + | − | 50 | aluminium silicate | 0.05 | alkylmethylisoquinolinium chloride** | 26 | 0.95 |
| + | + | 50 | aluminium silicate | 0.05 | alkylmethylisoquinolinium chloride** | 55 | 0.93 |
| + | − | 150 | calcium carbonate | 0.05 | phenyltrimethyl ammonium chloride | 14 | 0.83 |
| + | + | 150 | calcium carbonate | 0.05 | phenyltrimethyl ammonium chloride | 20 | 0.85 |
| + | − | 150 | calcium carbonate | 0.05 | stearyldimethyl-benzylamm·chloride | 15 | 0.80 |
| + | + | 150 | calcium carbonate | 0.05 | stearyldimethyl-benzylamm·chloride | 22 | 0.82 |

*mixture of
40% of dodecyldimethylbenzyl ammonium chloride
50% of tetradecyldimethylbenzyl ammonium chloride
10% of hexadecyldimethylbenzyl ammonium chloride

**mixture of
25% dodecylmethylisoquinolinium chloride
55% tetradecylmethylisoquinolinium chloride
17% hexadecylmethylisoquinolinium chloride

What is claimed is:

1. A process for preparing a stabilized, U.V. light curable composition comprising forming a mixture containing 0.1–5 percent by weight of a benzoin ether of a primary alcohol, 0.00001–0.001 percent by weight of a soluble copper compound, 0.001–0.1 percent by weight as a stabilizer of an organic chloro compound selected from the group consisting of (a) quaternary ammonium chlorides, (b) amine hydrochlorides and (c) compounds capable of forming chlorine ions in situ and the remainder an unsaturated polyester resin, said percentages by weight being calculated on the polyester resin.

2. The process according to claim 1, in which the composition contains 1 – 2 percent by weight of benzoin ether calculated on the polyester resin.

3. The process according to claim 1, in which the composition contains 0.0001 – 0.0002 percent by weight of copper calculated on the polyester resin.

4. The process according to claim 1, in which the composition contains 0.01 – 0.05 percent by weight of organic chloro compound.

5. The process according to claim 1, in which the stabilizer is a quaternary ammonium compound.

6. The process according to claim 1, in which the stabilizer is a salt of an amine and hydrogen chloride.

7. The process according to claim 1, in which the stabilizer is a compound having the general formula:

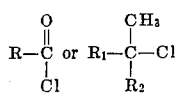

wherein R represents an alkyl group, $C_5$–$C_{20}$, or a substituted or non-substituted aryl group, $C_6$–$C_{12}$, $R_1$ is a substituted or non-substituted aryl group, $C_6$–$C_{12}$, and $R_2$ stands for hydrogen or an alkyl group, $C_1$–$C_4$.

8. The process according to claim 1, wherein the copper compound is copper naphthenate or copper octoate.

9. The process according to claim 1, containing one or more fillers in an amount of 5 – 500 percent by weight, calculated on the polyester resin.

10. A composition curable by U.V. light comprising 0.1–5 percent by weight of a benzoin ether of a primary alcohol, 0.00001–0.001 percent by weight of a soluble copper compound, 0.001–0.1 percent by weight as a stabilizer of an organic chloro compound selected from the group consisting of (a) quaternary ammonium chlorides, (b) amine hydrochlorides and (c) compounds capable of forming chlorine ions in situ and the remainder an unsaturated polyester resin, said percentages by weight being calculated on the polyester resin.

11. The composition as claimed in claim 10, which includes a quaternary ammonium compound.

12. The composition as claimed in claim 10, which includes a salt of an amine and hydrogen chloride.

13. The composition as claimed in claim 10, which includes a compound having the general formula:

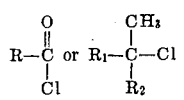

wherein R represents an alkyl group $C_5$–$C_{20}$, or a substituted or non-substituted aryl group, $C_6$–$C_{12}$, $R_1$ is a substituted or non-substituted aryl group, $C_6$–$C_{12}$, and $R_2$ stands for hydrogen or an alkyl group, $C_1$–$C_4$.

14. The composition as claimed in claim 10, containing 0.01 – 0.05 percent by weight of the organic chloro compound.

15. The composition as claimed in claim 10, in which the copper compound is copper naphthenate or copper octoate.

16. The composition as claimed in claim 10, containing in addition at least one filler in an amount of 5 – 500 percent by weight calculated on the polyester resin.

17. A process for curing unsaturated polyester resins, comprising irradiating with U.V. light the composition of claim 10.

* * * * *